United States Patent [19]
Reynolds et al.

[11] 4,124,090
[45] Nov. 7, 1978

[54] BOUNCELESS SEISMIC WAVE GENERATOR

[75] Inventors: Charles B. Reynolds; Thomas O. Summers, both of Albuquerque, N. Mex.

[73] Assignee: Charles B. Reynolds & Associates, Albuquerque, N. Mex.

[21] Appl. No.: 785,498

[22] Filed: Apr. 7, 1977

[51] Int. Cl.² .............................................. G01V 1/04
[52] U.S. Cl. .................................. 181/121; 181/114; 181/401; 173/126; 173/131
[58] Field of Search ..................... 181/121, 114, 401; 173/126, 131

[56] References Cited
U.S. PATENT DOCUMENTS

| | | | |
|---|---|---|---|
| 3,367,443 | 2/1968 | Mayne | 181/121 |
| 3,583,521 | 6/1971 | Anstey | 181/114 |

*Primary Examiner*—Howard A. Birmiel
*Attorney, Agent, or Firm*—Cahill, Sutton & Thomas

[57] ABSTRACT

A seismic wave generator constructed of fungible high density elements contained within a flexible envelope is dropped to impact upon the ground and generate seismic waves for seismic investigations. The non-rigid construction minimizes or eliminates bounce or reverberation after impact. Because of the lack of bounce and reverberation, recordings of the seismic waves produced are relatively free of superimposed wave forms otherwise resulting from multiple impacts.

14 Claims, 8 Drawing Figures

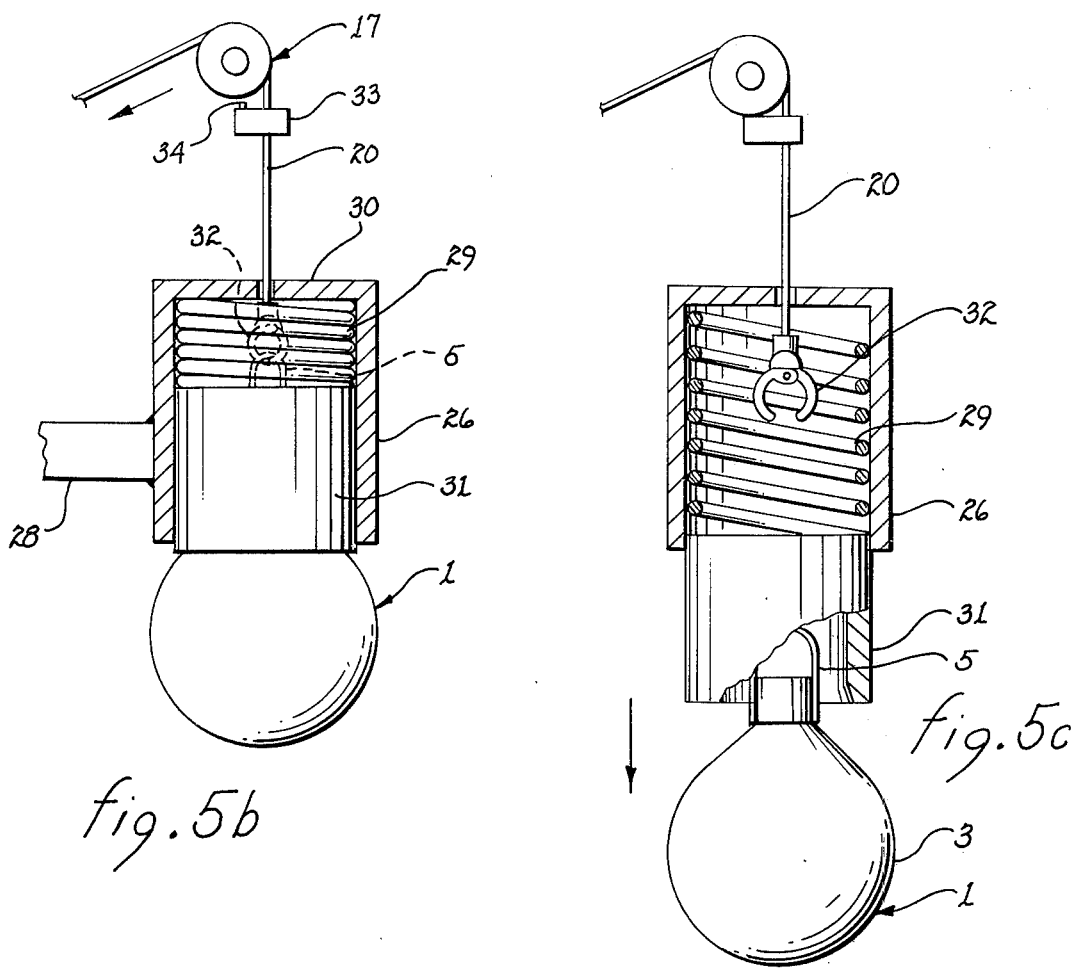
fig.5b
fig.5c
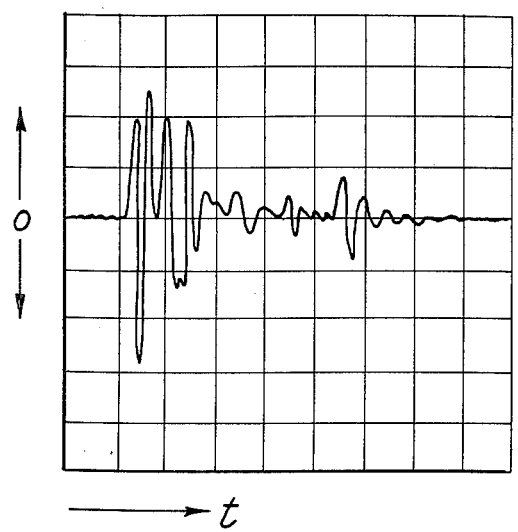
fig.3a
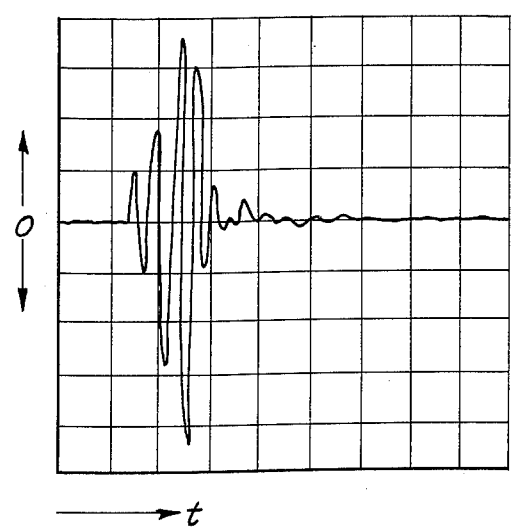
fig.3b

BOUNCELESS SEISMIC WAVE GENERATOR

The present invention relates to devices for generating seismic waves and, more particularly, to apparatus used in seismic investigations based on weight drop methods.

The recordation and study of artifically produced seismic waves have been conducted for many years in conjunction with various scientific, engineering and prospecting endeavors. One of the primary means used in recent years for generating artificial seismic waves has been that of dropping a weight against the surface of the earth or against the bottom of a hole; to increase the impact force, various means for propelling the weight have also been employed. At some locations an impact plate upon which the weight is dropped has been positioned upon the surface to sharpen the shock wave front. Commonly, 6000 lb. solid iron weights are widely used in petroleum exploration seismic studies while sledgehammers or solid round iron balls are used in engineering seismic investigations.

One of the primary difficulties encountered in employing the weight drop method is the tendency of the weight to bounce or reverberate. Such bounces or reverberations produce multiple impacts and create superimposed wave forces upon seismic wave recording equipment and result in complex wave forms which may tend to obscure the information content of a recording. This problem is particularly severe with weights substantially less than 6000 lbs. since such light weights tend to be more likely to bounce. Accordingly, the desirability of lighter weights which produce higher frequency seismic wave forms of particular benefit in seismic reflection studies is thwarted by the reduced decipherability of the recorded wave forms.

The following U.S. Patents are representative of various types of weights previously used and various mechanisms for dropping or imparting a downward force to these weights, Nos.: RE 26,825; RE 27,418; 2,816,618; 3,130,809; 3,185,250; 3,367,442; 3,489,240; 3,716,111; and 3,976,161.

It is therefore a primary object of the present invention to provide a droppable weight for use in seimsic investigations which produces a single non-reverberating impact.

Another object of the present invention is to provide apparatus for producing high amplitude low noise wave forms for use in seismic reflection studies.

Still another object of the present invention is to provide non-rigid weights for use in weight drop methods for creating seismic waves.

Yet another object of the present invention is to provide a droppable weight for use in seismic reflection studies which does not scar nor create depressions upon the surface on which the weight is dropped.

A further object of the present invention is to provide a weight for use in seismic reflection studies which does not bounce or roll.

A still further object of the present invention is to provide a non-rigid weight for use in weight drop methods to create seismic waves, which weight may be propelled against the point of impact.

A yet further object of the present invention is to provide apparatus for propelling a non-rigid weight against a point of impact.

These and other objects of the present invention will become apparent to those skilled in the art as the description thereof proceeds.

The present invention may be described with greater specificity and clarity with reference to the following drawings, in which:

FIGS. 3a and 3b illustrate the seismic wave forms obtained by prior art rigid weights and by a non-rigid weight, respectively.

FIGS. 5a, 5b and 5c illustrate apparatus for propelling a non-rigid weight against a point of impact.

Figure 1:
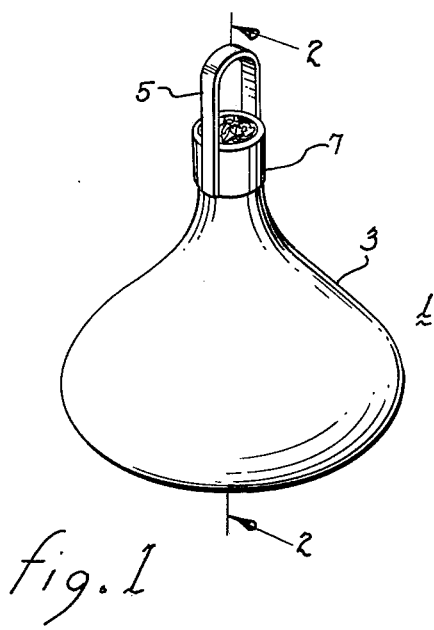
FIG. 1 is a perspective view of a non-rigid weight.

Referring to FIG. 1, there is shown a non-rigid weight 1 having a flexible envelope 3 and generally resembling a teardrop when suspended from loop 5. A collar 7 encircles and grippingly retains the upper end of the envelope. The collar may be detachably attached to the envelope to permit access interior to the envelope for purposes of increasing or reducing the amount of weight disposed therein. Loop 5 extends from collar 7 whereby transport of non-rigid weight 1 may be effected by exerting a force upon the loop.

Figure 2:
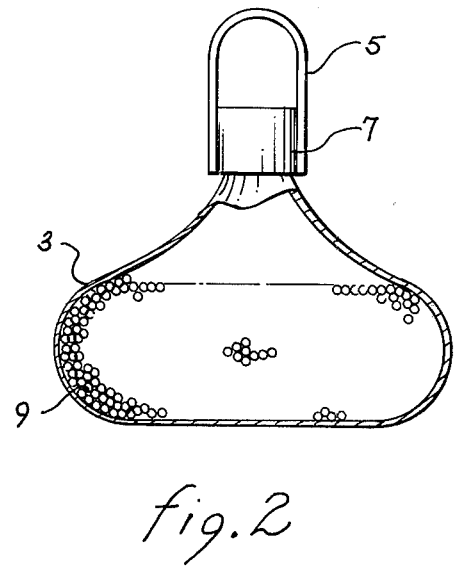
FIG. 2 is a cross-sectional view taken along lines 2—2, as shown in FIG. 1.

FIG. 2, being a partial cross-sectional view of the non-rigid weight shown in FIG. 1, primarily illustrates weights 9 disposed within envelope 3. These weights are preferably spherical in configuration and developed from high density materials such as lead, iron or steel and which are readily commercially available. Envelope 3 is constructed of flexible material having relatively high tensile strength, such as leather, particular types of plastic sheet or cloth of canvaslike characteristics.

As stated above, when non-rigid weight 1 is suspended from loop 5 it may be teardrop shaped or spherically shaped, depending upon the degree to which envelope 3 is filled with weights 9. After being dropped, the bottom surface of the envelope will tend to flatten at the point of impact, as illustrated in FIG. 2. This flattening is, of course, produced by the longitudinal and lateral forces acting upon the individual weights within envelope 3 as a result of the impact in combination with the compliant configuration of envelope 3. The shifting or movement of the weights tends to completely dampen or absorb the forces created by the impact and, with such immediate damping, reverberation or bounce of non-rigid weight 1 is essentially precluded.

Consequently, on dropping of non-rigid weight 1 upon a point of impact, an essentially single impact shock will be transmitted to the impacted surface. Reflection of shock wave produced by this single shock is readily detectable by recording equipment employed as part of scientific, engineering or prospecting seismic investigations.

By generating an essentially single shock wave, the recording traces obtained are essentially devoid of superimposed wave forms produced by secondary or tertiary impact forces and resulting from bouncing or reverberating dropped weights. Consequently, the deciphering of the recorded wave form and attendant analysis of the subterranean features of the ground affected by the impact force are rendered more accurate and a higher confidence level in the analysis can be achieved.

Referring now to FIGS. 3a and 3b, which figures depict representative wave forms recorded upon recording equipment used in seismic investigations, certain comparisons can be readily made. FIG. 3a illustrates the amplitude excursions of the wave forms produced by a rigid dropped weight. As discussed above, rigid weights have a tendency to bounce or reverberate subsequent to the initial impact. Such bouncing or reverberation produces secondary or tertiary shock waves which are transmitted through the subterranean volume of interest. These secondary and tertiary wave forms, upon being sensed by the recording equipment, necessarily become superimposed upon the primary wave forms and result in a highly complex composite recorded wave form. With adequate skill and technique, it is possible to accurately interpret the subterranean features from such complex wave forms but the decipherability thereof is impeded and the confidence factor or degree of reliability of the interpretation is necessarily impaired.

In various investigations, it is preferable to use relatively light weights, as such weights tend to produce higher frequency wave forms upon the recording equipment. However, light weight rigid weights have a tendency to bounce and thereby produce more than a single impact at the point of impact. Such plural impacts, for reasons stated above, produce complex wave forms which tend to obscure the data represented by the wave forms.

FIG. 3 illustrates a reproduction of a wave form produced by recording equipment in response to the dropping of non-rigid weight 1, illustrated in FIG. 1. This weight has little tendency to bounce or reverberate whereby only a single shock wave is developed. This single shock wave tends to produce amplitude excursions which are readily decipherable and relatively easily interpretable. Moreover, the absence of secondary or tertiary shock waves tends to eliminate the production of complex wave forms. Because the non-rigid weight has little tendency to bounce or reverberate, it is very feasible to employ relatively light weights to obtain higher frequency wave forms without incurring a serious probability of bounce or reverberation. Accordingly, the present invention permits the use of a droppable weight which may be light or heavy, the selection of which is more dependent upon the type and nature of the wave forms to be generated rather than upon the degree of probability of bounce or reverberation.

Aside from the accuracy available through the use of non-rigid weights, several additional advantages also exist. Whenever a substantial rigid weight is dropped, there is present a real danger that the weight will bounce or roll and injure or damage persons or other apparatus. Because of the physical characteristics of the non-rigid weight illustrated in FIGS. 1 and 2, such a possibility does not exist. Additionally, the compliant nature of envelope 3 of non-rigid weight 1 tends to preclude scarring of the impact area or the formation of depressions therein.

Figure 4:
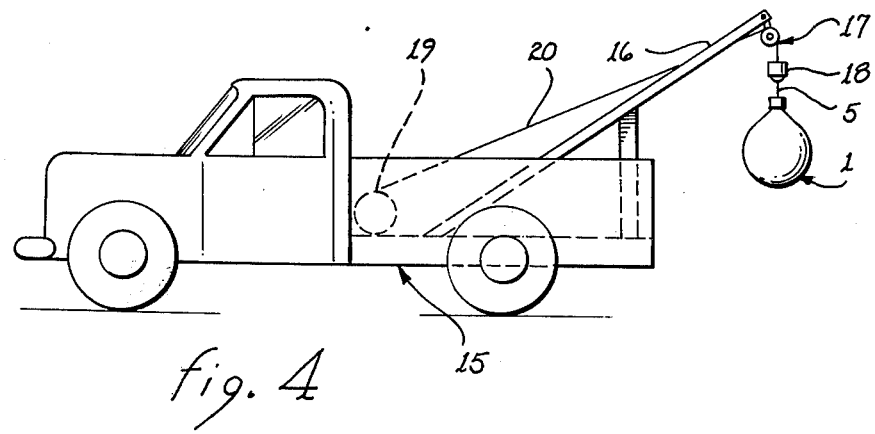
FIG. 4 illustrates a means for carrying out a weight dropping method for seismic reflection studies based upon the use of non-rigid weights.
Figure 5A:
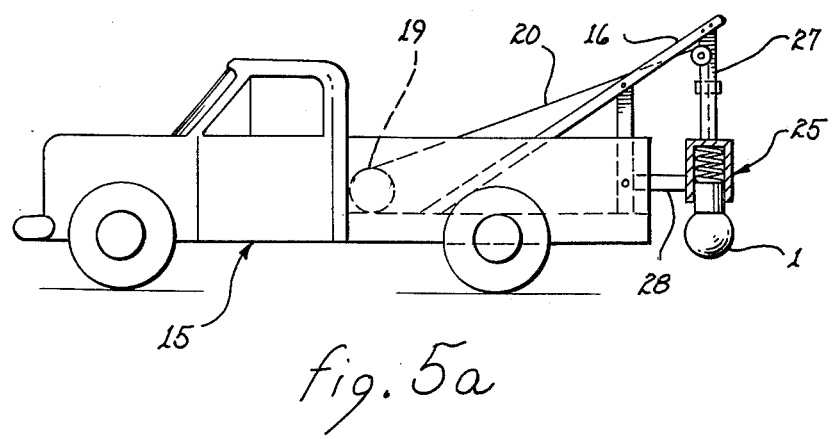

FIG. 4 illustrates a conventional truck 15 or similar vehicle, which may be emloyed to transport and selectively drop non-rigid weight 1 upon a point of impact. Such a truck may include a rearwardly extending boom 16 for supporting non-rigid weight 1 at a height above the impact area. A cable and pulley mechanism 17 is employed to raise and retain the non-rigid weight. A trigger mechanism 18 may be employed to release loop 5; or, in the alternative, a release mechanism associated with drum 19 may be employed to allow cable 20 to unreel from the drum in response to downward excursion of the non-rigid weight.

Where an impact force greater than that achievable by dropping the non-rigid weight from boom 16 is necessary, a propelling mechanism, as illustrated in FIGS. 5a, 5b and 5c, may be employed. Such a mechanism precludes the need to raise the boom to an unmanageable height and yet provides the capability of substantially increasing the impact velocity of the non-rigid weight. Propelling mechanism 25 includes a cylindrical sleeve 26 rigidly supported by members 27 and 28 attached to boom 16 and truck 15, respectively. A coil spring 29, or similar compressible member, is lodged within sleeve 26 and constrained against upward movement therefrom by a plate 30 or similar restraining element. A shroud 31 is disposed at and attached to the free end of coil spring 29 and which shroud is free to translate longitudinally within sleeve 26. The free end of cable 20 of cable and pulley mechanism 17 includes a releasable clasp 32 for releasably gripping loop 5 of non-rigid weight 1. A trigger mechanism 33 may be attached to cable 20 to open clasp 32 upon engagement of plunger 34 with a pulley of pulley mechanism 17, with boom 16, or with an appendage extending from the boom. Clasp 32 may be opened by being forcibly drawn against plate 30.

In operation, cable 20 is unreeled from drum 19 until clasp 32 extends downwardly from shroud 31 for engagement with loop 5 of non-rigid weight 1. Simultaneously, coil spring 29 is uncompressed and has forced shroud 31 to partially extend downwardly from within sleeve 26. After clasp 32 has been closed about loop 5, cable 20 is reeled upon drum 19 to raise the weight. Upon engagement of the annular end of shroud 31 by envelope 3 of the non-rigid weight, an upward force will be exerted upon the shroud to force it into sleeve 26 and compress coil spring 29. Further reeling of cable 20 will result in complete, or nearly complete, compression of coil spring 29 and the relationship of the non-rigid weight with respect to propelling mechanism 25 will be that illustrated in FIG. 5b. On actuation of trigger mechanism 33, clasp 32 will open and release loop 5. Simultaneously, the retaining force upon shroud 31 will be removed and the force of coil spring 29 will propel shroud 31 sharply downwardly. The downward movement of shroud 31 will be transmitted to non-rigid weight 1 to accelerate the weight toward the impact area. Thereby, the impact force of non-rigid weight 1 upon the impact area is increased over that available had the weight been simply dropped.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

We claim:

1. A droppable non-rigid weight for impacting without bounce upon a ground surface to generate seismic waves during seismic investigations, said non-rigid weight comprising in combination:
   a. a grouping of weights for developing the mass of said non-rigid weight;
   b. a flexible envelope for enclosing said grouping of weights, said flexible envelope being conformable in shape to a redistribution of said grouping of weights upon impact of said non-rigid weight with the ground surface; and c. means attached to said flexible envelope for releasably suspending said non-rigid weight above the ground surface;

whereby, redistribution of said grouping of weights within said envelope eliminates bounce of said non-rigid weight upon impact with the ground surface.

2. The non-rigid weight as set forth in claim 1 wherein said grouping of weights comprises high density metallic elements.

3. The non-rigid weight as set forth in claim 1 wherein said grouping of weights comprises lead shot.

4. The non-rigid weight as set forth in claim 3 wherein said flexible envelope comprises leather.

5. The non-rigid weight as set forth in claim 4 including collar means for closing said flexible envelope and supporting said suspending means.

6. A bounce free weight for use in seismic investigations to generate seismic waves, said weight being droppable upon an impact area from a supporting member, said weight comprising:

a. an aggregation of elements for developing the mass of said weight, said aggregation having a variable configuration;

b. a flexible envelope for enveloping said aggregation, said envelope being conformable to internally and externally imposed forces altering the configuration of said aggregation; and c. attachment means secured to said envelope for releasably attaching said weight to said supporting member;

whereby, on impact of said weight upon the impact area, the impact force transmitted to said aggregation is attenuated by a simultaneous change in configuration of said aggregation and a conforming change in configuration of said envelope.

7. The weight as set forth in claim 6 wherein said aggregation comprises metallic elements.

8. The weight as set forth in claim 7 wherein said aggregation comprises lead shot.

9. The weight as set forth in claim 8 wherein said envelope comprises leather.

10. The weight as set forth in claim 6 wherein said supporting member comprises:

a. a hoist means for raising said weight;

b. pre-load means rigidly secured with respect to said hoist means for propelling said weight against the impact area;

c. said hoist means including:

i. clasp means for releasably engaging said attachment means of said weight; and ii. a cable attached to said clasp means for drawing said weight against said pre-load means to arm said pre-load means; and d. trigger means for releasing said pre-load means;

whereby, said weight is propelled toward the impact area by said pre-load means.

11. The weight as set forth in claim 10 wherein said pre-load means comprises:

a. a sleeve rigidly secured to said hoist means;

b. a shroud slidably mounted with respect to said sleeve for bearing against said envelope; and c. spring means disposed intermediate said sleeve and said shroud for urging said shroud away from said sleeve.

12. A non-rigid weight droppable from a hoist for use in conjunction with seismic investigations based upon weight drop methods to generate seismic waves, said non-rigid weight comprising in combination:

a. particulate means for developing the mass of said non-rigid weight;

b. flexible means for enclosing said fungible particulate means, said flexible means being conformable to changes in configuration of said fungible particulate means; and c. loop means secured to said flexible means for attaching said non-rigid weight to the hoist.

13. A method for generating seismic waves during seismic investigations, said method comprising the steps of:

a. dropping a non-rigid weight upon an impact area;

b. developing an impact force upon the impacting of the non-rigid weight on the impact area to generate a seismic wave by flattening the non-rigid weight at the point of contact between the non-rigid weight and the impact area; and c. dissipating the reverberation and bounce of the non-rigid weight after the initial impact by rearranging the external configuration of the non-rigid weight in response to and absorbative of the resultant forces developed within the non-rigid weight after impact;

whereby, said method generates a single seismic wave for analysis and investigation.

14. The method as set forth in claim 13 including the step of recording the seismic wave generated by the impact force and the reflections of the seismic wave from subterranean features proximate to the impact area.

* * * * *